US011915239B2

(12) United States Patent
Cron, Jr. et al.

(10) Patent No.: US 11,915,239 B2
(45) Date of Patent: Feb. 27, 2024

(54) SYSTEM AND METHOD FOR UPDATING AND MANAGING HOSTED CATALOGS IN A PROCUREMENT SYSTEM

(71) Applicant: BuyerQuest, Inc., Berea, OH (US)

(72) Inventors: Nicholas J Cron, Jr., Perrysburg, OH (US); Salman Siddiqui, Schaumburg, IL (US)

(73) Assignee: BuyerQuest, Inc., Boca Raton, FL (US)

( * ) Notice: Subject to any disclaimer, the term of this patent is extended or adjusted under 35 U.S.C. 154(b) by 207 days.

(21) Appl. No.: 17/079,419

(22) Filed: Oct. 24, 2020

(65) Prior Publication Data

US 2021/0065181 A1 Mar. 4, 2021

Related U.S. Application Data

(63) Continuation of application No. 15/277,351, filed on Sep. 27, 2016, now Pat. No. 10,839,389.

(51) Int. Cl.
*G06Q 40/00* (2023.01)
*G06N 5/025* (2023.01)
*G06Q 20/40* (2012.01)

(52) U.S. Cl.
CPC .......... *G06Q 20/401* (2013.01); *G06N 5/025* (2013.01)

(58) Field of Classification Search
CPC .............................. G06Q 20/401; G06N 5/025
See application file for complete search history.

(56) References Cited

U.S. PATENT DOCUMENTS 5,870,717 A 2/1999 Wiecha
6,578,030 B1 * 6/2003 Wilmsen ................. G06F 16/30
(Continued)

FOREIGN PATENT DOCUMENTS

FR 2834161 * 6/2003 ............ G06F 17/30
WO WO-03054738 A1 * 7/2003 ............ G06Q 30/06
(Continued)

OTHER PUBLICATIONS

Trung T. Pham and Simone K. Fuchter, "Implementation of Large Catalogs for Price Enforcement in B2B E-Commerce," Proceedings of the IEEE International Conference on E-Commerce Technology, 2004 (Year: 2003).*

(Continued)

*Primary Examiner* — Hani M Kazimi
*Assistant Examiner* — William B. Bunker
(74) *Attorney, Agent, or Firm* — Robert Nupp; Paul Katterle

(57) ABSTRACT

Disclosed herein are systems, methods, and non-transitory computer-readable storage media for updating and managing hosted catalogs in a procurement system. A procurement system is provided comprising at least one live hosted catalog and at least one staged hosted catalog. Catalog update files are received into the system, and a data integration component validates and imports the catalog updates to the staged catalog, and an authorized buyer user is presented a summary of the update information and, upon an acceptance of the updates by the buyer user, the catalog update information is promoted to the live hosted catalog. In one embodiment a central catalog service maintains status information of the updates and coordinates workflow. In another embodiment, the system evaluates the update information and determines whether an approval is required.

13 Claims, 6 Drawing Sheets

(56) References Cited

U.S. PATENT DOCUMENTS

| | | |
|---|---|---|
| 7,082,408 B1 | 7/2006 | Baumann |
| 7,546,253 B2 | 6/2009 | Andersson |
| 7,716,089 B1 | 5/2010 | Gavarini |
| 7,797,271 B1 * | 9/2010 | Bonneau ............... G06Q 30/02 705/26.8 |
| 7,853,253 B2 | 12/2010 | Gharabally |
| 8,069,096 B1 | 11/2011 | Ballaro |
| 8,473,357 B2 | 6/2013 | Tan |
| 8,556,631 B2 | 10/2013 | King |
| 8,694,429 B1 * | 4/2014 | Ballaro ............. G06Q 30/0635 705/40 |
| 8,694,519 B2 | 4/2014 | Fein |
| 8,819,072 B1 | 8/2014 | Croicu |
| 8,843,483 B2 | 9/2014 | Kritt |
| 8,929,667 B1 | 1/2015 | Yuhan |
| 8,930,244 B2 | 1/2015 | Ballaro |
| 8,931,038 B2 | 1/2015 | Puller |
| 8,943,065 B2 | 1/2015 | Tan |
| 9,009,841 B2 | 4/2015 | Amit |
| 9,081,798 B1 | 7/2015 | Wong |
| 9,092,519 B2 * | 7/2015 | Khedouri ......... H04N 21/41407 |
| 9,183,049 B1 | 11/2015 | Corley |
| 9,443,260 B2 * | 9/2016 | Chan ................. G06Q 30/0603 |
| 10,055,770 B2 * | 8/2018 | Ogrinz .............. G06Q 30/0601 |
| 2002/0161672 A1 * | 10/2002 | Banks .................. G06Q 30/06 705/26.8 |
| 2004/0012631 A1 | 1/2004 | Skorski |
| 2005/0060324 A1 * | 3/2005 | Johnson ............... G06Q 30/06 |
| 2005/0251409 A1 * | 11/2005 | Johnson ............... G06Q 30/02 705/343 |
| 2007/0162363 A1 * | 7/2007 | Chollon ............. G06Q 30/0623 705/30 |
| 2008/0120129 A1 | 5/2008 | Seubert |
| 2009/0177714 A1 * | 7/2009 | Obermeyer ........ G06Q 30/0601 707/999.203 |
| 2011/0078046 A1 * | 3/2011 | Tan ....................... G06Q 30/06 715/229 |
| 2011/0258083 A1 * | 10/2011 | Ren .................... G06Q 30/0633 705/26.1 |
| 2011/0286037 A1 | 11/2011 | Hamada |
| 2012/0290926 A1 | 11/2012 | Kapadia |
| 2018/0075048 A1 * | 3/2018 | Vimberg ............... G06F 16/178 |
| 2020/0097498 A1 * | 3/2020 | Tang .................. G06F 11/1464 |
| 2020/0118076 A1 * | 4/2020 | Ballaro ................. G06F 16/24 |

FOREIGN PATENT DOCUMENTS

| | | | |
|---|---|---|---|
| WO | WO2003054738 A1 | 7/2003 | |
| WO | WO-2003083620 * | 10/2003 | ............. G06F 17/60 |
| WO | WO2003083620 A2 | 10/2003 | |

OTHER PUBLICATIONS

Meersman et al., Semantic Issues in E-Commerce Systems, pp. 219-248, Kluwer Academic Publishers, 2002 (Year: 2002).*

Georgantis et al., "A Review and Evaluation of Platforms and Tools for building e-Catalogs," Proceedings of the 35th International Conference on System Sciences, 2002 (Year: 2002).*

Trung T. Pham et al., "Implementation of Large Catalogs for Price Enforcement in B2B E-Commerce," Proceedings of the IEEE International Conference on E-Commerce Technology, 2004.

* cited by examiner

SYSTEM AND METHOD FOR UPDATING AND MANAGING HOSTED CATALOGS IN A PROCUREMENT SYSTEM

CROSS REFERENCE TO RELATED APPLICATIONS

The present application claims the benefit of priority under 35 USC 120 of U.S. nonprovisional application Ser. No. 15/277,351, filed Sep. 27, 2016, which claims the benefit of priority under 35 U.S.C. 119(e) of U.S. provisional application Ser. No. 62/284,407, filed Sep. 29, 2015. The entire contents of these applications are incorporated herein by reference.

TECHNICAL FIELD

The present disclosure relates to improved management of catalog information in a procurement system.

BACKGROUND

In general, electronic procurement systems, such as those comprising procure to pay (P2P) systems, provide a platform enabling buyer users at buying organizations to search and shop for items (e.g., goods or services) of different suppliers, create purchase requisitions, and create and place purchase orders with the suppliers for one or several items. P2P systems may provide additional functionality as well, including but not limited to providing workflow to enable authorizing entities within buying organizations to review and authorize requisitions generated by their personnel, providing electronic document processing memorializing the transactions, and the like.

Supplier catalogs are important to procurement systems for a number of reasons. For example, catalogs contain the items and item attribute information enabling buyer users to search and shop for, e.g., goods and services. From a supplier perspective, catalogs are the vehicles for them to communicate information, such as product attributes and commercial terms (e.g., price, unit-of-measure), about their goods and services to buyers.

Procurement systems may allow for buyers to receive catalog information from various suppliers and host it as part of the system ("internally hosted" or simply "hosted" catalogs), in lieu of or in addition to providing buyers access to catalogs or catalog information that is externally hosted by, for example, individual suppliers, through the use of "punchout", cXML, and/or other means.

The size and complexity of internally hosted catalogs varies, depending on a number of factors. One factor is simply the number of items from various suppliers that are hosted in the buyer's catalog. Another factor is the richness and complexity of the item content. For example, rich content implies items having a relatively large number of attributes (e.g., title, description, related items, images, sizes, filter categories, etc.)

The task of loading catalog information into a buyer's procurement system becomes increasingly difficult and inefficient as the buyer's hosted catalog grows and/or the content becomes increasingly rich or complex. In addition, the task of monitoring, validating and approving changes to existing catalog content (e.g., price information) becomes increasingly difficult as the number of supplier catalogs increases and/or the number of items and/or complexity of attribute information increases. Accordingly, in order to allow for procurement systems that rely increasingly or exclusively on internally hosted catalog content, there is a need for systems and methods that allow for improved loading of catalog information. In addition, there is a need for systems and methods that allow for improved oversight, validation and approval of proposed catalog information changes.

BRIEF SUMMARY

A computer-implemented method for updating and managing hosted catalogs in a procurement system is disclosed. A system and computer program product are also disclosed that perform the functions of the method. The method includes, in one embodiment, providing a procurement system comprising an input store, a data integration component, an application database, a base procurement application, and at least one live catalog and at least one staged catalog. The at least one live catalog and the at least one staged catalog are hosted in the application database. A catalog update is received to the input store, and the catalog update comprises catalog update information having attribute information of at least one new item or updated attribute information of at least one existing item, or both. The data integration component validates the catalog update information to determine whether the catalog update information meets pre-determined criteria. The data integration component imports the catalog update information to the at least one staged catalog if the catalog update information is determined to meet the pre-determined criteria. The catalog update information is presented to an authorized buyer user of the procurement system and the authorized buyer user is enabled to accept or reject the catalog update information. If the buyer user indicates acceptance of the catalog update information, the data integration component promotes the catalog update information from the at least one staged catalog to the at least one live catalog.

The method, in another embodiment, includes providing a central catalog service component as part of the procurement system. In this embodiment, the central catalog service component coordinates the workflow of the method. In another embodiment, to be validated the catalog update information must have a valid character set, have all pre-determined required fields, and meet pre-determined core value comparison criteria. In still another embodiment, to be imported the catalog update file is reduced to a delta file and insert records are based on the delta file information. In yet another embodiment, a change report consisting essentially of delta information is generated at the import step, and the delta information is presented to the authorized buyer user.

In another aspect, a computer-implemented method for updating and managing hosted catalogs in a procurement system is disclosed. A system and computer program product are also disclosed that perform the functions of the method. The method includes, in one embodiment, providing a procurement system comprising an input store, a data integration component, an application database, a base procurement application, and at least one live catalog and at least one staged catalog. The at least one live catalog and the at least one staged catalog are hosted in the application database. A catalog update is received to the input store, and the catalog update comprises catalog update information having attribute information of at least one new item or updated attribute information of at least one existing item, or both. The data integration component validates the catalog update information to determine whether the catalog update information meets pre-determined criteria. The data integration component validates the catalog update information to determine whether the catalog update information meets pre-determined criteria. The data integration component imports the catalog update information to the at least one staged catalog if the catalog update information is determined to meet the pre-determined criteria. A change report is generated is generated summarizing the catalog update information, and it is evaluated to determine whether the catalog update information needs to be approved or rejected by an authorized buyer user. If so, the catalog update information is presented to an authorized buyer user, who is enabled to accept to reject the catalog update information. If an indication of acceptance is received by the authorized buyer user, the data integration component promotes the catalog update information from the at least one staged catalog to the at least one live catalog.

The method, in another embodiment, includes providing a central catalog service component as part of the procurement system. In this embodiment, the central catalog service component coordinates the workflow of the method. In another embodiment, to be validated the catalog update information must have a valid character set, have all pre-determined required fields, and meet pre-determined core value comparison criteria. In still another embodiment, to be imported the catalog update file is reduced to a delta file and insert records are based on the delta file information. In yet another embodiment, a change report consisting essentially of delta information is generated at the import step, and the delta information is presented to the authorized buyer user. In another embodiment, the change report is evaluated by a rules engine of the base procurement application. In still another embodiment, the rules engine is artificially intelligent.

BRIEF DESCRIPTION OF THE DRAWINGS

The present disclosure, in accordance with one or more various embodiments, is described in detail with reference to the following drawings. The drawings are provided for purpose of illustration only and merely depict aspects of typical or example embodiments. These drawings are provided to facilitate the reader's understanding of the disclosure and shall not be considered limiting of the breadth, scope, or applicability of the disclosure.

The components in the drawing are not necessarily drawn to scale. In the drawings, like reference numerals designate corresponding parts throughout the several views. One of ordinary skill in the art will appreciate that a component may be designed as multiple components or that multiple components may be designed as a single component.

DETAILED DESCRIPTION

Figure 1:
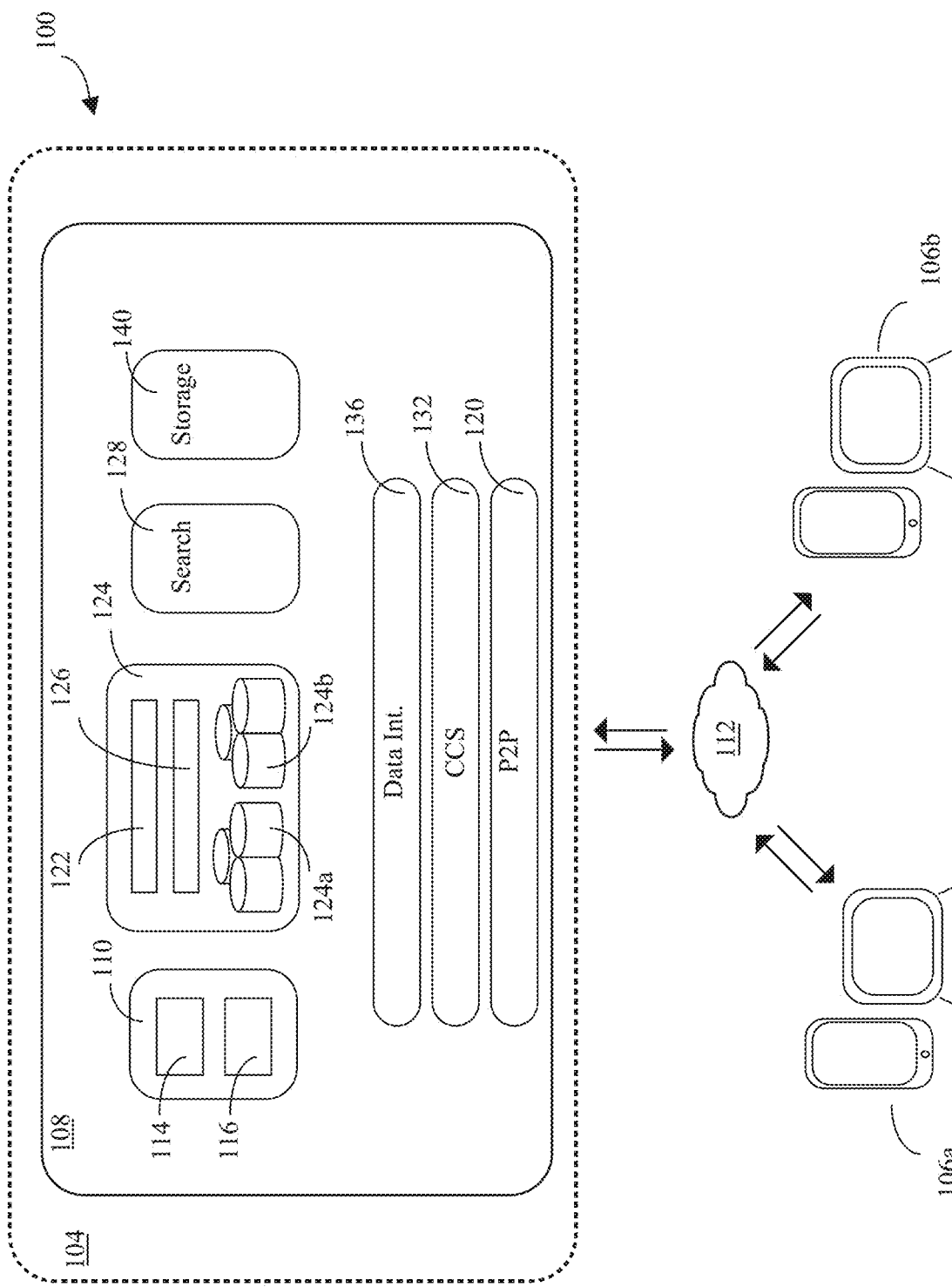
FIG. 1 is a block diagram illustrating components of an exemplary operating environment in which various embodiments of the present disclosure may be implemented.

The present disclosure describes and illustrates one or more novel embodiments for updating and managing hosted catalog information in a buyer procurement system. It should be understood that aspects, features or functions that are described in relation to an embodiment are not necessarily limited to the embodiment described, but rather may be applicable to one or more embodiments, unless expressly described otherwise. Also, the description set forth herein is not to be construed as limited to the embodiments shown. Rather, it is appreciated that various modifications may occur to those skilled in the art that, while not specifically set forth herein, are nevertheless within the spirit and scope of the description. When an embodiment is described as "exemplary" herein, it is to be understood as one non-limiting example embodiment, and does not preclude other embodiments that may not include the limitations described in the exemplary embodiment.

As may be appreciated by one of skill in the art, aspects of the embodiments described herein may be employed as a system, method or computer program product. Accordingly, aspects may take the form of a hardware embodiment, a software embodiment (including firmware, etc.) or an embodiment combining hardware and software that may all generally be referred to herein as a "module," "component," or "system." Further, aspects of the present invention may take the form of a computer program product embodied in one or more computer readable medium(s) having computer readable program code represented thereon.

For example, a supplier user may wish to upload a catalog update file to a buyer's hosted catalog in the buyer's electronic procurement system. In general, a catalog update comprises addition of new items to the buyer's hosted catalog and/or modification to items currently-existing in the buyer's hosted catalog. A catalog update file may be one of several types or sub-types, including but not limited to a commercial file (e.g., common fields file, tiered pricing file) and an enrichment file (e.g., inventory file, attributes file, configurable options file). Generally, a commercial file may be one that makes updates to "commercial" terms of items including, but not limited to, attributes such as, for example: price, lead time, unit of measure and tiered pricing discounts. Note that commercial files may include the addition of new items or attributes to a buyer's hosted catalog. An enrichment file may be one used to update or add non-commercial attributes of items. Note, as used herein the term "item" means a catalog entity to be searched and shopped in the procurement system, such as for example, a product or a service. The catalog update file format may generally comprise any file format sufficient to store and communicate item information. In one exemplary embodiment, catalog update file format comprise .csv, zip, gzip, xml, or json files. In another exemplary embodiment, catalog update files may comprise .csv files in which each row corresponds to an item record that is keyed by an SKU or similar identifier, and each separated value corresponds to a particular attribute or other item characteristic.

The catalog update file(s) may be uploaded to an intake storage (such as for example a cloud storage bucket) and a data integration component or engine (as used interchangeably herein) may be used to validate the catalog update information in the uploaded file(s) and import and stage the information as records for approval by an authorized buyer user. In at least one embodiment, the system is configured such that only certain catalog file types (e.g., commercial files) are staged for approvals, while others (e.g., enrichment files) are loaded after validation directly into the live procurement application environment. In certain embodiments, a central catalog service component may be used to centrally store status information (e.g., pending validation, pending approval, pending search synch, live, etc.) for all catalog update files and centralize the management of workflow for the data integration component. In other embodiments, status information and workflow management may be accomplished by another suitable component, such as for example the base procurement application, or by several components.

As shown in FIG. 1, an exemplary network environment 100 implementing a system according to various embodiments described herein includes a service provider environment 104 in data communication with one or more clients, such as supplier user clients 106*a* and buyer user clients 106*b*, via network 112. Network 112 may be the internet, intranets, extranets, local area networks (LANs), wide area networks (WANs), wired networks, wireless network (using wireless protocols and technologies such as, e.g., Wifi), or any other network suitable for providing data communications between two machines, environments, devices, networks, etc.

A service provider environment, such as service provider environment 104, may comprise cloud infrastructure, platform, and/or software providing the various servers, databases, data stores, and the like, necessary to provide the services described herein. Alternatively, service provider environment 104 may comprise one or more dedicated host machines and software providing the various servers, databases, data stores, and the like, necessary to provide the services described herein.

With continuing reference to FIG. 1, the following may be deployed on service provider environment 104 (or distributed among a plurality of service provider environments and/or host systems) to comprise procurement system 108. Storage 110 may be any suitable storage for efficiently allowing file intake, storage, and access; for example, storage 110 may be simple web-based object storage comprising one or more logical units of storage (e.g., buckets), such as application data store 114 and input data store 116. Input data store 116 may comprise one or more logical units of storage 110 configured to receive catalog update information from one or more supplier user clients 106*a*. In one embodiment, a supplier user client 106*a* may connect to an sFTP server (not shown) and upload a catalog update file to the sFTP server, and synching logic (not shown) may thereafter execute to move the uploaded file into input data store 116. In another embodiment, a supplier user client 106*a* may utilize a supplier portal (not shown) to connect to procurement system 108 and supply a catalog update file, which is thereafter moved to input data store 116. In one exemplary embodiment, storage 110 is Amazon® S3 object storage or IBM® cloud object storage.

Referring to FIG. 1, base procurement application 120 may comprise a procurement base application deployed on service environment 104. For example, base procurement application may comprise a procure-to-pay (P2P) base application. (Note that "base procurement application" and "P2P application" are used interchangeably herein). Base procurement application 120 (which itself may comprise one or more components, applications or modules) provides certain basic front and backend functionality for users (such as buyer user using buyer user clients 106*b*) to, e.g., search, requisition, and order catalog items. Base procurement application 120 provides functionality such as, e.g., storing and retrieving catalog content, generating content pages, rendering, building and managing requisitions and orders, interfacing to buyer backend systems (e.g., financial and accounting systems, etc.) and other procurement components or sub-systems (e.g., search), workflow, event messaging, commercial documentations, etc. Base procurement application 120 may be supported by one or more application databases 124. Database 124 may be any database sufficient to support the functionality of procurement system 108, such as for example a relational database and/or a document-oriented database. In one exemplary embodiment, procurement system 108 utilizes both MySQL® database 124*a* as well as a MongoDB® database 124*b*.

Continuing with FIG. 1, procurement system 108 may include at least one hosted catalog that is a staged catalog (staged catalog 122) and one that is live (live catalog 126). A "staged" catalog generally connotes one that is inactive, or otherwise that is not accessible to ordinary buyer users of procurement system 108, while a "live" catalog connotes one that is accessible by ordinary users. A hosted catalog, as generally described above, may comprise one or more tables (or collections, depending on the database type) that maintain records (or documents, depending on the database type) of items.

Continuing with FIG. 1, search component 128 may also be deployed on service environment 104 to provide full text search functionality for catalog items of procurement system 108. In one exemplary embodiment, search component 128 is a Solr search engine configured to provide full text searching of hosted catalog content.

Continuing with FIG. 1, persistent block storage 140 may be deployed on service environment 104 and may comprise a network-attached storage that persists independently of base procurement application instance 120. Storage 140 may be utilized for such purposes as, for example, storing media or other large files, storing backups, and the like.

In some embodiments, a central catalog service may be provided. In FIG. 1, a central catalog service component 132 is shown deployed on service environment 104, although it may alternatively be deployed on other networked environments or host systems. Central catalog service component 132 may comprise a central service for all catalog loads, for all procurement system 108 instances, used to store status and other information of all catalog updates and to centralize the work queue for data integration component 136. Data integration component 136 may comprise a data integration engine used to extract and validate data from catalog update files, and to transform and load the data into the base procurement application and search databases, as well as to update status and file information in CCS component 132. (Note, the terms "central catalog service component" and "CCS component" may be used interchangeably herein). As shown in FIG. 1, data integration component 136 is deployed on service environment 104; however, it may alternatively be deployed on other networked environments or host systems. In one or more embodiments (not shown), a central catalog service is not provided; rather, the functions are accomplished by one or more modules of other system components, or by other components. For example, in one embodiment, the functions of CCS component 132 may be provided by base procurement application 120.

Figure 2:
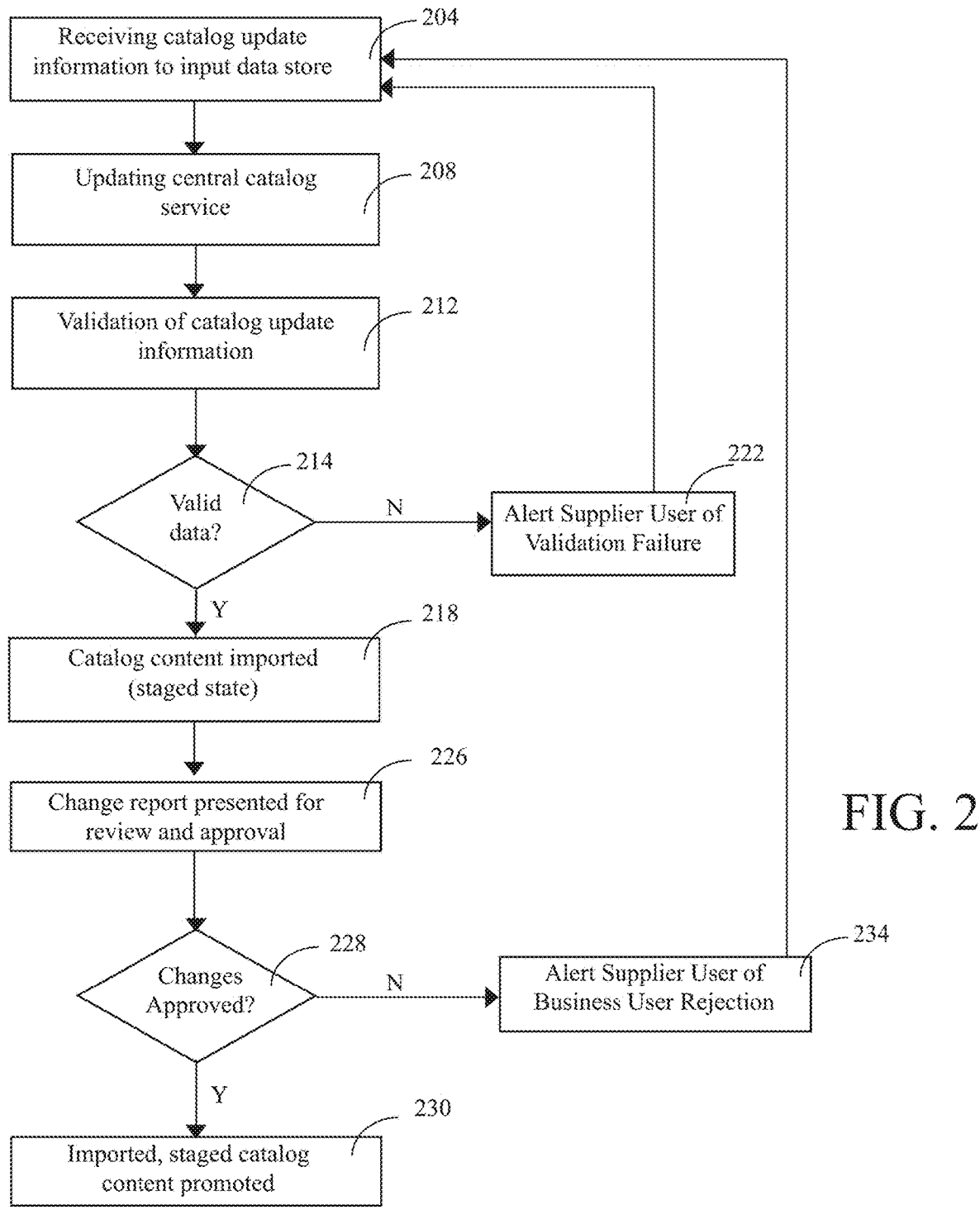
FIG. 2 is a flowchart illustrating an exemplary operation of the procurement system according to various embodiments described herein, as well as illustrating an exemplary method for updating and managing hosted catalogs in the procurement system according to various embodiments described herein.

Turning now to FIG. 2, shown is a flowchart that provides one example of the operation of procurement system 108 (FIG. 1) according to various embodiments described herein. Note that the flowchart of FIG. 2 shows just an example of the different types of functional arrangements that may be employed to implement the operation of that system as described herein. Alternatively, the flowchart shown in FIG. 2 may be viewed as showing one example of steps of a method for updating and managing hosted catalogs in procurement system 108, under the control of one or more sub-systems configured with executable instructions, according to one or more embodiments.

Note that although functional operations in the Figures herein, including FIGS. 2-5, are depicted in a particular order, the methods described herein are not necessarily limited to the particular order illustrated. A person of ordinary skill in the art may appreciate that all or a subset of the operations shown in the Figures herein, including FIGS. 2-5, may be rearranged, changed, performed in different order (e.g., in parallel, in reverse order) combined, or omitted altogether without departing from the scope of the present disclosure or the spirit of the novel embodiments described herein. In addition, the functional steps depicted herein are intended to provide an understanding of the method to a person of ordinary skill in the art, rather than specifying an actual sequence of code execution, which may be implemented as different sequences or flows or modified in various ways to, e.g., optimize performance or functionality. In particular, any function calls or sequences of such calls described herein are intended to provide an understanding of the methods to a person of ordinary skill in the art, rather than specify actual call format or sequence, which may be implemented as different calls or sequence of calls or modified in various ways to, e.g., optimize performance or functionality.

Continuing with FIG. 2, at step 204 input data store 116 (FIG. 1) may receive catalog update information from, e.g., an sFTP site configured to receive catalog update information uploads from a supplier user in the form of, for example, a catalog update file. The catalog update information may comprise information corresponding to at least one new item (no record corresponding to the item exists in the buyer's catalog) or updated information of at least one existing item (a record corresponding to the item exists in the buyer's catalog), or both. Updated information of at least one existing file may comprise, for example, update information of at least one attribute (e.g., a different price, different product description, etc.) of the at least one existing file. As referenced above, the catalog update file may be one of several types or sub-types, including but not limited to a commercial file and an enrichment file. The catalog update file format may comprise, for example, .csv, zip, gzip, xml, json files.

At step 208, the catalog update file may be added to central catalog service component 132 (FIG. 1), and a record (document) corresponding to the file is created that includes status information concerning the catalog update. Note, the terms "document" and "record" are used interchangeably herein in the context of the central catalog service 132. In one exemplary embodiment, a web service may be called to create the CCS record, which includes information comprising, for example: instance ID, the file name, storage location, file type, supplier ID, and current file status information (e.g., "pending validation"). Note that in embodiments that do not comprise a central catalog service component, step 208 may be replaced by one or more steps sufficient to provide maintenance of catalog update status and management of workflow associated with catalog updates.

At step 212, the catalog update information may be validated by data integration component 136 (FIG. 1). In one embodiment, data integration component 136 may periodically query for status information indicative of a catalog update file awaiting validation and initiate the validation sub-process. In another exemplary embodiment, the validation sub-process may be initiated via a call to data integration component 136. In one embodiment, data integration component 136 thereafter may query central catalog service 132 (or other components in those embodiments that do not have a central catalog service) for information relating to the catalog update file, such as for example: instance ID, file name, file location, and supplier ID. Data integration component 136 may then read the file and check for any warning and error conditions, or otherwise check for any pre-determined validation criteria, and may generate a validation report summarizing the validation results. In one exemplary embodiment, the validation report is stored in application data store 114 (FIG. 1).

At step 214, procurement system 108 may determine if the catalog update file passed the validation stage, and if so may proceed to the import sub-process (step 218); otherwise, the system may alert the supplier user of the validation failure in step 222. In one exemplary embodiment, the central catalog service 132 may be called to update the CCS record corresponding to the catalog update file, and in particular to update the status information to indicate whether the file has passed or failed the validation routine executed by data integration component 136 in step 212. In one exemplary embodiment, data integration component 136 may call a web service to update the CCS record to include information comprising, for example: instance ID, file name (of validated file), storage location, file type, supplier ID, validation report location, number of warning conditions, number of error conditions, and current file status information (e.g., validation passed or failed). (Note that in embodiments that do not comprise a central catalog service, the status information indicative of a successful/failed validation may be written to any component(s) that perform the function of maintaining catalog update status, in lieu of the central catalog service). In one exemplary embodiment, if any error conditions are present, and/or if any pre-determined criteria are not met, data integration component 136 may include status information indicative of a failed validation (e.g., "failed validation") in the update call to the central catalog service 132; otherwise, it includes status information indicative of a successful validation (e.g., "pending import"). In one exemplary embodiment, the pre-determined criteria are selected by applying analytics to historical information of the buyer or supplier and/or individual users.

Continuing with step 214, if the determination is a failed validation, procurement system 108 may alert the supplier user of the failed validation. In one exemplary embodiment central catalog service 132 may call base procurement application 120 (FIG. 1) to indicate a failed validation, and base procurement application 120 notifies the supplier user of the failed validation in step 222. In another exemplary embodiment, base procurement application 120 may periodically query central catalog service 132 (or other component(s) performing the function of maintaining the status) for any records corresponding to a catalog update file having a status indicating a failed validation, and thereafter notifies any supplier user in step 222 if any such documents are returned. In one exemplary embodiment, the notification is accomplished via an email containing a link to the relevant validation report.

At step 218, upon a determination of a successful validation, the import sub-process may be initiated to import the catalog update information in the catalog update file. In one exemplary embodiment, the import sub-process may be initiated via a call (e.g., web service call) to data integration component 136 from central catalog service 132 (or other component(s) performing the function of managing update workflow). In another exemplary embodiment, the import sub-process may be initiated automatically by data integration component 136 upon a determination that the catalog update file is valid. In one embodiment, when the sub-process is initiated, data integration component 136 may then query central catalog service 132 for information relating to the catalog update file, such as: instance ID, file name (of validated catalog update file); storage location; and supplier ID.

Continuing with step 218, data integration component 136 may generate documents (records) for insert into application database 124 (FIG. 1) corresponding to the catalog update information of the successfully validated file, and the newly created documents (records) may be written to application database 124. (Note, the term "document" and "record" are used interchangeably herein, in the context of the application database). In particular, data integration component 136 may write the newly created records to staged catalog 122 (FIG. 1).

In one embodiment, data integration component 136 may write the newly created records to staged catalog 122 or to live catalog 126 (FIG. 1). For this embodiment, in general whether the records are imported to staged catalog 122 or to live catalog 126 depends on whether the buyer user wishes to review a given set of records for approval/rejection, prior to the records entering the live procurement system environment. For example, a buyer user may configure procurement system 108 such that, if the newly created records were generated from a "commercial" file type, they may be loaded to staged catalog 122, while records generated from an "enrichment" file type (e.g., inventory files) may be loaded directly to live catalog 126. Additional and/or different criteria may be set by the buyer. For example, a buyer may configure procurement system 108 such that any records from certain identified suppliers are automatically imported to live catalog 126, and not to staged catalog 122.

In one embodiment, central catalog service 132 (or other component(s) performing the function of maintaining status information) may be called to update the CCS record corresponding to the catalog update file, and in particular to update the status information to indicate whether the catalog update file is pending approval or live (waiting search sync), depending on whether records were inserted into staged or live catalogs, respectively. In one exemplary embodiment, data integration component 136 calls a web service to update the CCS.

Also in step 218, in one exemplary embodiment data integration component 136 may generate a change report summarizing the information contained in the newly created records inserted into staged catalog 122. In one embodiment, the change report may be stored in application data store 114 (FIG. 1). In one exemplary embodiment, central catalog service 132 (or other component(s) performing the function of maintaining status information) may be called to update the CCS record corresponding to the catalog update file, and in particular to add the file name and storage location information for the change report. In one exemplary embodiment, data integration component 136 may call a web service to update the CCS record to add the aforementioned information.

At step 226, the approval sub-process is initiated and procurement system 108 (FIG. 1) presents the change report (catalog update information) to an authorized buyer user for approval or rejection. In one exemplary embodiment, data integration component 136 may call base procurement application 120 (FIG. 1) via a web service to indicate a pending approval status of the catalog update, and base procurement application 120 may notify the authorized buyer user of that fact and provides a link to the change report or otherwise provides change report information to the buyer user for review. Alternatively, base procurement application 120 may periodically query central catalog service 132 (or other suitable component(s)) for any records corresponding to a catalog update file having a status indicating pending approval, and thereafter notifies the authorized buyer user if any such documents are returned. The notice may be accomplished in any sufficient manner, such as for example, an email notification, a notice on the buyer user's customized P2P application web page or portal, etc. In one exemplary embodiment, the notification may be accomplished via an email containing a link to the relevant change report.

Also in step 226, procurement system 108 presents an authorized user with a means to approve or reject the catalog update corresponding to the change report information. In general, the approve/reject means may be accomplished in any sufficient manner. For example, in one exemplary embodiment, an email notification containing change report information (catalog update information) or a buyer user's customized website or portal containing change report information (catalog update information), also contains approve/reject buttons or links that, when selected, kickoff subsequent workflow (e.g., the promotion sub-process). In one exemplary embodiment, procurement system 108 is configured in such a manner that an indication of approval/rejection by the authorized buyer user results in a call to the central catalog service component 132 (or other suitable component(s)), via web service or otherwise, to update the status information in the document corresponding to the catalog update, so that it reflects a status of being approved or rejected.

At step 228, procurement system 108 (FIG. 1) may determine if the authorized buyer user approved or rejected the catalog update. In one exemplary embodiment, a call is made to data integration component 136 (FIG. 1) to indicate an approved catalog update status upon a buyer user indication. In another exemplary embodiment, a periodic query of central catalog service 132 (or other suitable component(s)) is run for any records corresponding to a catalog update having a status indicating a rejected (approved) status.

In any event, at step 234, if a rejected status is determined, procurement system 108 may notify the appropriate supplier user. In one exemplary embodiment, the notification is accomplished via email.

At step 230, if an approved status is determined, the promotion sub-process is initiated to promote to a live state the records that were imported to staged catalog 122 in step 218. In one exemplary embodiment, data integration component 136 moves the imported records from staged catalog 122 to live catalog 126, and may or may not modify the records by, for example, updating any flags or indicators corresponding to a live versus a staged status. In one exemplary embodiment, data integration component 136 may call central catalog service 132 (or other suitable component(s)) to update the record corresponding to the catalog update to include information comprising, for example, a current status of the imported catalog update records. In one exemplary embodiment, the current status after promotion is "live," or similar. In another exemplary embodiment, the current status after promotion is "pending search sync" or similarly indicative of a status wherein the record is live, but workflow remains to synchronize search component 128 (FIG. 1).

In one embodiment, at step 230, the promotion sub-process also comprises data integration component 136 creating records for search component 128 that correspond to the imported (now live) records and inserting them in search component 128 such that they are available for search.

Figure 3:
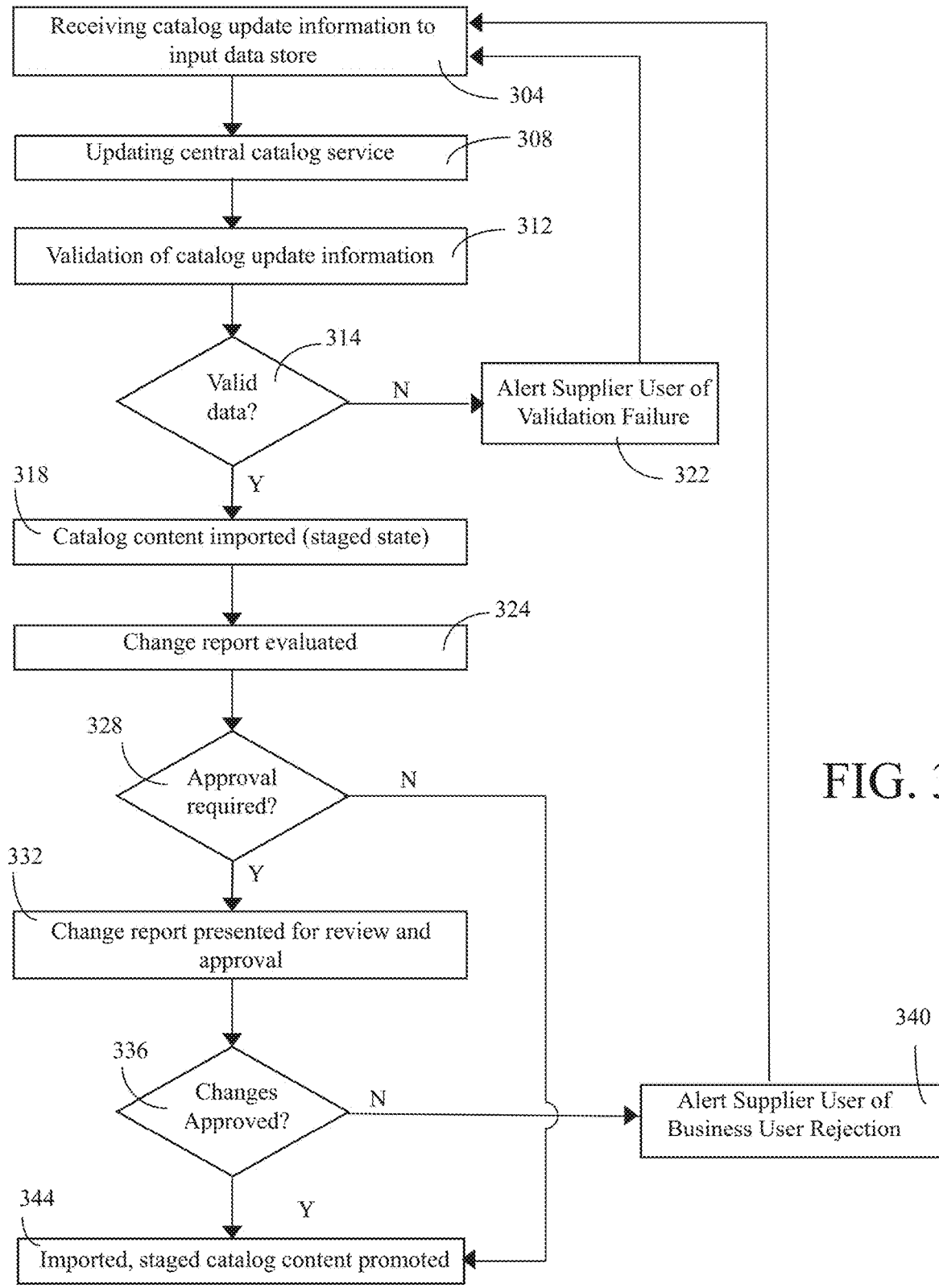
FIG. 3 is a flowchart illustrating an exemplary operation of the procurement system according to various embodiments described herein, as well as illustrating an exemplary method for updating and managing hosted catalogs in the procurement system according to various embodiments described herein.

Turning now to FIG. 3, shown is a flowchart that provides one example of the operation of procurement system 108 (FIG. 1) according to various embodiments described herein. Note that the flowchart of FIG. 3 shows just an example of the different types of functional arrangements that may be employed to implement the operation of that system as described herein. Alternatively, the flowchart shown in FIG. 3 may be viewed as showing one example of steps of a method for updating and managing hosted catalogs in procurement system 108, under the control of one or more sub-systems configured with executable instructions, according to one or more embodiments.

Continuing with FIG. 3, at step 304 input data store 116 (FIG. 1) may receive catalog update information from, e.g., an FTP site configured to receive catalog update information uploads from a supplier user in the form of, for example, a catalog update file. The catalog update information may comprise information corresponding to at least one new item (no record corresponding to the item exists in the buyer's catalog) or updated information of at least one existing item (at least one record corresponding to the item exists in the buyer's catalog), or both. As referenced above, the catalog update file may be one of several types or sub-types, including but not limited to a commercial file and an enrichment file. The catalog update file format may comprise, for example, .csv files.

At step 308, the catalog update file may be added to central catalog service component 132 (FIG. 1), and a record (document) corresponding to the file is created that includes status information concerning the catalog update. In one exemplary embodiment, a web service may be called to create the CCS record, which includes information comprising, for example: instance ID, the file name, storage location, file type, supplier ID, and current file status information (e.g., "pending validation"). Note that in embodiments that do not comprise a central catalog service component, step 308 may be replace by one or more steps sufficient to provide maintenance of catalog update status and management of workflow associated with catalog updates.

At step 312, the catalog update information may be validated by data integration component 136 (FIG. 1). In one embodiment, data integration component 136 may periodically query for status information indicative of a catalog update file awaiting validation and initiate the validation sub-process. In another exemplary embodiment, the validation sub-process may be initiated via a call to data integration component 136. In one embodiment, data integration component 136 thereafter may query central catalog service 132 (or other components in those embodiments that do not have a central catalog service) for information relating to the catalog update file, such as for example: instance ID, file name, file location, and supplier ID. Data integration component 136 may then read the file and check for any warning and error conditions, or otherwise check for any pre-determined validation criteria, and may generate a validation report summarizing the validation results. In one exemplary embodiment, the validation report is stored in application data store 114 (FIG. 1).

At step 314, procurement system 108 may determine if the catalog update file passed the validation stage, and if so may proceed to the import sub-process (step 318); otherwise, the system may alert the supplier user of the validation failure in step 322. In one exemplary embodiment, the central catalog service 132 may be called to update the CCS record corresponding to the catalog update file, and in particular to update the status information to indicate whether the file has passed or failed the validation routine executed by data integration component 136 in step 312. In one exemplary embodiment, data integration component 136 may call a web service to update the CCS record to include information comprising, for example: instance ID, file name (of validated file), storage location, file type, supplier ID, validation report location, number of warning conditions, number of error conditions, and current file status information (e.g., validation passed or failed). (Note that in embodiments that do not comprise a central catalog service, the status information indicative of a successful/failed validation may be written to any component(s) that perform the function of maintaining catalog update status, in lieu of the central catalog service). In one exemplary embodiment, if any error conditions are present, and/or if any pre-determined criteria are not met, data integration component 136 may include status information indicative of a failed validation (e.g., "failed validation") in the update call to the central catalog service 132; otherwise, it includes status information indicative of a successful validation (e.g., "pending import"). In one exemplary embodiment, the pre-determined criteria are selected by applying analytics to historical information of the buyer or supplier and/or individual users.

Continuing with step 314, if the determination is a failed validation, procurement system 108 may alert the supplier user of the failed validation. In one exemplary embodiment central catalog service 132 may call base procurement application 120 (FIG. 1) to indicate a failed validation, and base procurement application 120 notifies the supplier user of the failed validation as step 322. In another exemplary embodiment, base procurement application 120 may periodically query central catalog service 132 (or other component(s) performing the function of maintaining the status) for any records corresponding to a catalog update file having a status indicating a failed validation, and thereafter in step 322 notifies any supplier user if any such documents are returned. In one exemplary embodiment, the notification is accomplished via an email containing a link to the relevant validation report.

At step 318, upon a determination of a successful validation, the import sub-process is initiated to import the catalog update information in the catalog update file. In one exemplary embodiment, the import sub-process may be initiated via a call (e.g., web service call) to data integration component 136 from central catalog service 132 (or other component(s) performing the function of managing update workflow). In another exemplary embodiment, the import sub-process may be initiated automatically by data integration component 136 upon a determination that the catalog update file is valid. In one embodiment, when the sub-process is initiated, data integration component 136 may then query central catalog service 132 for information relating to the catalog update file, such as: instance ID, file name (of validated catalog update file); storage location; and supplier ID.

Continuing with step 318, data integration component 136 may generate documents (records) for insert into application database 124 (FIG. 1) corresponding to the catalog update information of the successfully validated file, and the newly created documents (records) may be written to application database 124. In particular, data integration component 136 may write the newly created records to staged catalog 122 (FIG. 1). In one embodiment, central catalog service 132 (or other component(s) performing the function of maintaining status information) may be called to update the CCS record corresponding to the catalog update file, and in particular to update the status information to indicate that the catalog update file is pending approval. In one exemplary embodiment, data integration component 136 calls a web service to update the CCS.

Also in step 318, in one exemplary embodiment data integration component 136 may generate a change report summarizing the information contained in the newly created records inserted into staged catalog 122. In one embodiment, the change report may be stored in application data store 114 (FIG. 1). In one exemplary embodiment, central catalog service 132 (or other component(s) performing the function of maintaining status information) may be called to update the CCS record corresponding to the catalog update file, and in particular to add the file name and storage location information for the change report. In one exemplary embodiment, data integration component 136 may call a web service to update the CCS record to add the aforementioned information.

At step 324, the change report may be evaluated by procurement system 108 to determine whether the newly generated and staged catalog update records must be presented to an authorized buyer user for review and approval, or whether the records may be automatically approved (i.e., approved by procurement system 108 without presenting the records for approval to an authorized user). In one exemplary embodiment, base procurement application 120 (or any other component with sufficient functionality) may evaluate the change report to make that determination. The determination may be made based on static rules configured by the buyer in procurement system 108. In one exemplary embodiment, such static rules may include, but are not limited to: any updates from identified suppliers are to be auto-approved, any updates relating only to certain file types (e.g., enhancement files) are to be auto-approved, and any updates modifying only price and only under a threshold percentage increase are to be auto-approved. Alternatively, the determination may be made based on rules that are not static, and that may be varied based on factors evaluated by, e.g., a rules engine (not shown). In one exemplary embodiment, the rules engine is artificially intelligent.

At step 328, the determination is made whether approval is required from a buyer user, depending on the evaluation in step 324. If the evaluation results in a determination that no approval is required, the catalog update may be given a status of "auto-approved", or similar, by procurement system 108, and workflow advances to step 344 (importing sub-process). Otherwise, the catalog update may be given a status that indicates it is pending user approval, or similar, by procurement system 108, and workflow advances to step 332. In one exemplary embodiment, upon making a determination whether the catalog update should be auto-approved or not, base procurement application 120 calls central catalog service component 132 (or other similarly functioning component(s), depending on the embodiment) to update the CCS record corresponding to the catalog update file, and in particular to update the status information to indicate either that the file has been auto-approved or is pending user approval (i.e., has not been auto-approved).

At step 332, the approval sub-process is initiated and procurement system 108 presents the change report (catalog update information) to an authorized buyer user for approval or rejection. In one exemplary embodiment, upon determining that the catalog update requires user approval in step 328, base procurement application 120 may notify the authorized buyer user that updates are pending for approval and provides a link to the change report or otherwise provides change report information to the buyer user for review. In another exemplary embodiment, base procurement application 120 may periodically query central catalog service 132 (or other similarly functioning component(s)) for any records corresponding to a catalog update file having a status indicating pending user approval, and may thereafter notify the authorized buyer user if any such documents are returned. The notice may be accomplished in any sufficient manner, such as for example, an email notification, a notice on the buyer user's customized P2P application web page or portal, etc. In one exemplary embodiment, the notification may be accomplished via an email containing a link to the relevant change report.

Also in step 332, procurement system 108 presents an authorized user with a means to approve or reject the catalog update corresponding to the change report information. In general, the approve/reject means may be accomplished in any sufficient manner. For example, in one exemplary embodiment, an email notification containing change report information (catalog update information) or a buyer user's customized website or portal containing change report information (catalog update information), also contains approve/reject buttons or links that, when selected, kickoff subsequent workflow. In one exemplary embodiment, procurement system 108 is configured in such a manner that an indication of approval/rejection by the authorized buyer user results in a call to the central catalog service component 132 (or other suitable component(s)), via web service or otherwise, to update the status information in the document corresponding to the catalog update, so that it reflects a status of being approved or rejected.

At step 336, procurement system 108 may determine if the authorized buyer user approved or rejected the catalog update. In one exemplary embodiment, a call is made to data integration component 136 (FIG. 1) to indicate an approved catalog update status upon a buyer user indication. In another exemplary embodiment, a periodic query of central catalog service 132 (or other suitable component(s) is run for any records corresponding to a catalog update having a status indicating a rejected (approved) status.

In any event, at step 340, if a rejected status is determined, procurement system 108 may notify the appropriate supplier user. In one exemplary embodiment, the notification is accomplished via email.

At step 344, if an approved status is determined, the promotion sub-process is initiated to promote to a live state the records that were imported to staged catalog 122 in step 318. In one exemplary embodiment, data integration component 136 moves the imported records from staged catalog 122 to live catalog 126, and may or may not modify the records by, for example, updating any flags or indicators corresponding to a live versus a staged status. In one exemplary embodiment, data integration component 136 may call central catalog service 132 (or other suitable component(s)) to update the record corresponding to the catalog update to include information comprising, for example, a current status of the imported catalog update records. In one exemplary embodiment, the current status after promotion is "live," or similar. In another exemplary embodiment, the current status after promotion is "pending search sync" or similarly indicative of a status wherein the record is live, but workflow remains to synchronize search component 128 (FIG. 1).

In one embodiment, at step 344, the promotion sub-process also comprises data integration component 136 creating records for search component 128 that correspond to the imported (now live) records and inserting them in search component 128 such that they are available for search.

Figure 4:
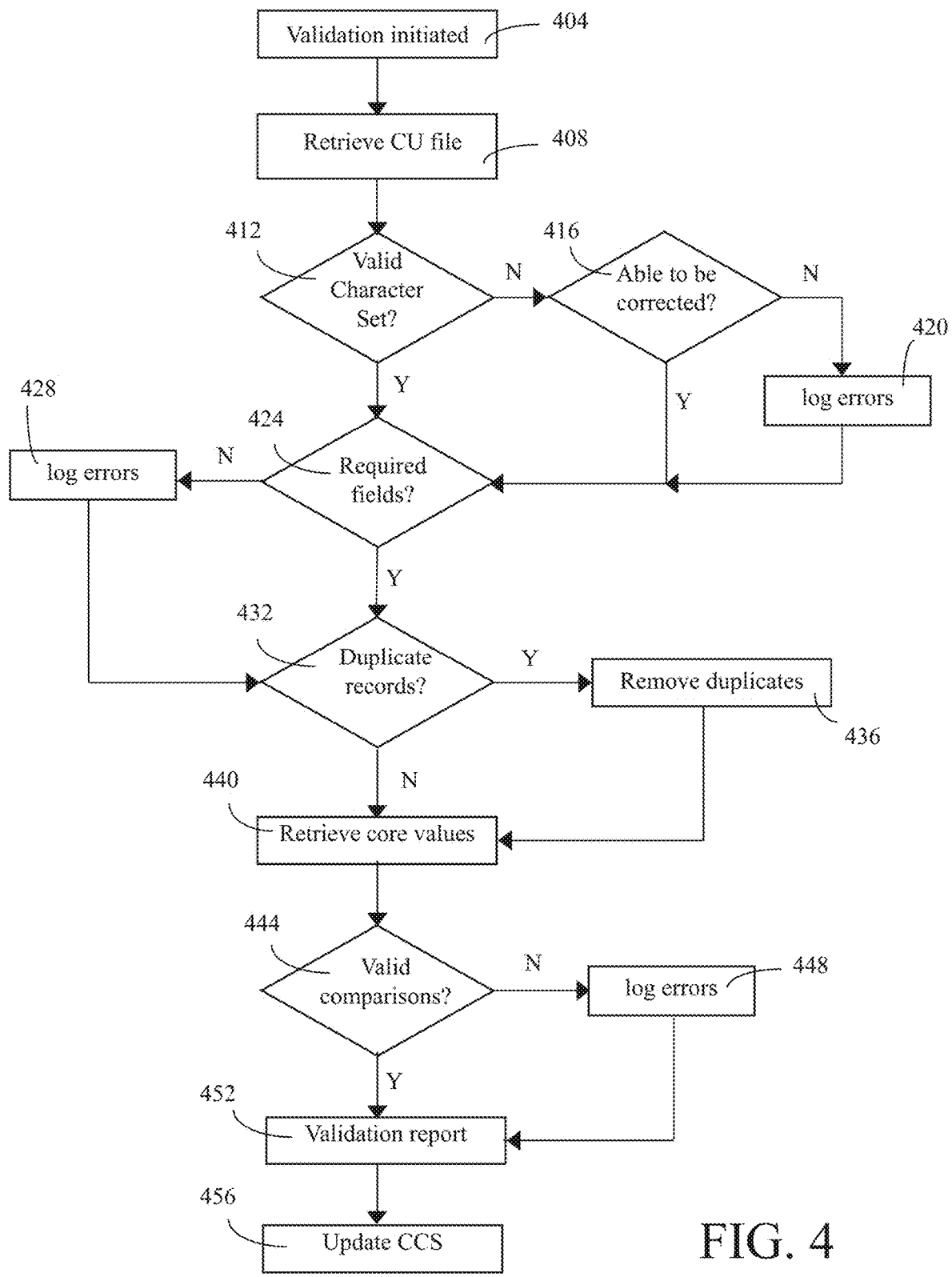
FIG. 4 is a flowchart illustrating an exemplary operation of a validation sub-process according to various embodiments described herein, as well as illustrating an exemplary validation sub-process utilized in various embodiments described herein.

Turning now to FIG. 4, shown is a flowchart that provides one non-limiting example of a validation sub-process that may be employed in various embodiments described herein. At step 404, data integration component 136 (FIG. 1) may be called via, e.g., a web service call, to initiate the validation sub-process. At step 408, data integration component 136 may query central catalog service component 132 (FIG. 1) (or other component(s) performing the function of maintaining catalog update metadata) to retrieve metadata associated with the catalog update file that needs to be loaded. Such data may comprise, for example: the name of the catalog update file, the location in input data store 116, and a supplier user identifier. At step 412, data integration component 136 reads the catalog update file and determines whether the catalog update information has a valid character set. If not, at step 416 data integration component 136 may correct any invalid characters that it is able to, and if there are any invalid characters that are not able to be corrected, data integration component 136 may log them as errors at step 420.

At step 424 data integration component 136 may determine whether the catalog update information contains all required fields, such as for example: part number, name, short description, unit of measure (uom), currency, and list price. In general, required fields may be any field pre-determined and configured to be required in procurement system 108. If not, data integration component 136 may log any missing field as an error at step 428.

At step 432, data integration component 136 may determine whether any duplicate records are present in the catalog update information. If so, at step 436 data integration component 136 removes any such duplicate record.

At step 440, data integration component 136 may retrieve a set of core configuration values from a configuration table in database 124 to use for validating values provided in the catalog update information for any core fields. In general, core field values may comprise any field values pre-determined and configured in the system to be core. In one exemplary embodiment, core values include values for the following fields: contract price, unit of measure, standard product and service code, and currency. At step 444, data integration component 136 may compare values provided in the catalog update information to the retrieved data set of core values, using pre-determined comparison rules, to determine whether an error condition exists. If any core value provided in the catalog update information does not result in a valid comparison, data integration component 136 may log any such value as an error in step 448.

At step 452, data integration component 136 may generate a validation report and move it as a file (for example, as a .csv file) to an identifying folder in application data store 114 (FIG. 1) of storage 110.

At step 456, data integration component 136 may add the (now modified) catalog update file to catalog central service component 132 (FIG. 1) (or any other suitable component(s)), and may update the CCS record corresponding to the catalog update with at least the changed status information, reflecting whether the catalog update file passed or failed the validation. In one exemplary embodiment, data integration component 136 may keep a tally of the number of error and warning conditions and pass the information onto catalog central service component 132 to update the CCS record corresponding to the catalog update.

Figure 5:
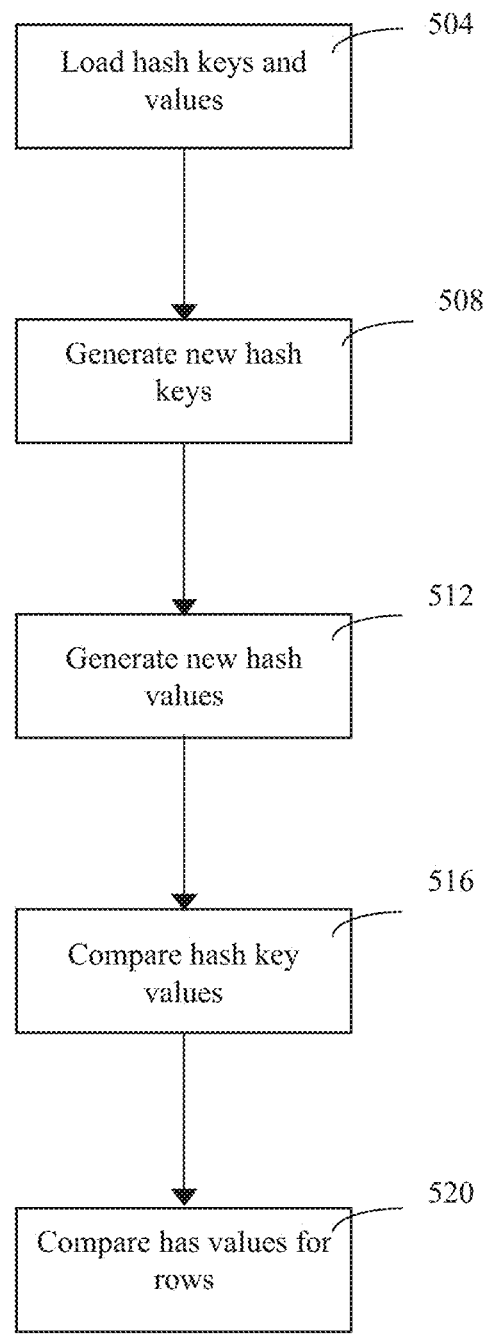
FIG. 5 is a flowchart illustrating an exemplary operation of an import sub-process according to various embodiments described herein, as well as illustrating an exemplary import sub-process utilized in various embodiments described herein.

Turning now to FIG. 5, shown is a flowchart that provides one non-limiting example of an import sub-process utilizing a hashing procedure, that may be employed in various embodiments described herein, including those embodiments illustrated by the prior FIGS. In general, the hashing process illustrated may be used to compare data in a catalog update file with the data that then-exists in the hosted catalog to determine which, if any, data is identical and therefore already present in the hosted catalog, so that such data can be disregarded in subsequent processing, thereby increasing system efficiency. In particular, the hashing process may determine whether any given row (record/document) in a given supplier-provided catalog update (each row corresponding to an item record) contains any new information, such as whether the record represents an entirely new item, or whether there is any attribute information that has been changed for any item that is already present in the hosted catalog for that supplier.

By using the hashing process, a full catalog update file may be transformed (reduced) to a "delta" file, containing delta information—essentially only those records or information directed to new items or updated attribute information of existing items, as compared with the hosted catalog. In this manner, system resources are conserved, since only new or updated records are processed by the system in subsequent workflows.

At step 504, procurement system 108 (FIG. 1) loads existing hash keys and values for the supplier that is being processed. In one exemplary embodiment, data integration component 136 (FIG. 1) loads all existing keys and values from an existing hash table/collection (not shown) in application database 124 for the supplier in question. At step 508, procurement system 108 generates new hash keys for comparison. In one exemplary embodiment, data integration component 136 generates the new hash keys. In one embodiment, data integration component 136 generates the new hash keys using a suitable key field in the catalog update file records, such as for example, an item identifier such as part number or SKU number, and applying a cyclic redundancy check to the key field values.

At step 512, procurement system 108 generates, for each row/record, hash values for each record. In one embodiment, data integration component 136 calculates hash values by applying a cyclic redundancy check to the entire row of data for each record.

At step 516, procurement system 108 compares the generated hash key values (generated in step 508) with the existing hash key data set and if any generated hash key is not found in the existing hash key data set, the system determines that the corresponding row (record) should be processed in subsequent workflows. For example, in one embodiment data integration component 136 copies or moves any identified rows to a separate delta file. In another embodiment, data integration component 136 marks each identified row as delta information needing to be further processed. Any such identified key value may be subsequently inserted in the existing hash table/collection in application database 124.

At step 520, procurement system 108 compares the generated hash values (generated in step 512) with the existing hash value data set and if any generated hash value is found, system 108 determines that the data does not need to be processed (as it is already present in the system). In one embodiment, data integration component 136 marks any such identified row as not needing to be further processed. In another embodiment, data integration component 136 removes any such identified data from the delta file. Further, if any generated hash value is not found in the existing hash value data set, the system determines that the corresponding row (record) should be processed in subsequent workflows. For example, in one embodiment data integration component 136 copies or moves any identified rows to the delta file. In another embodiment, data integration component 136 marks each identified row as delta information needing to be further processed. Any hash value that is not found in the existing hash value data set may be subsequently inserted in the existing hash table/collection in application database 124.

Referring to FIGS. 2 & 3, as an example of certain embodiments, the importing step (steps 218 and 318) may further comprise generation of a delta file/delta information from the catalog update file supplied by a supplier user, and creating insert records based on the delta file/delta information for insert into one or more tables/collections in the application database 124 (e.g., staged catalog 122 and/or live catalog 126). In addition, the importing steps may further comprise generating a change report comprising of delta information. In one embodiment, the change report consists essentially of delta information only. Moreover, the presenting steps (steps 226 and 332) may further comprise presenting the delta information to the authorized buyer user for approval. In this manner, the buyer user need only see the information that has changed in an item record, allowing for quick and efficient review.

Figure 6:
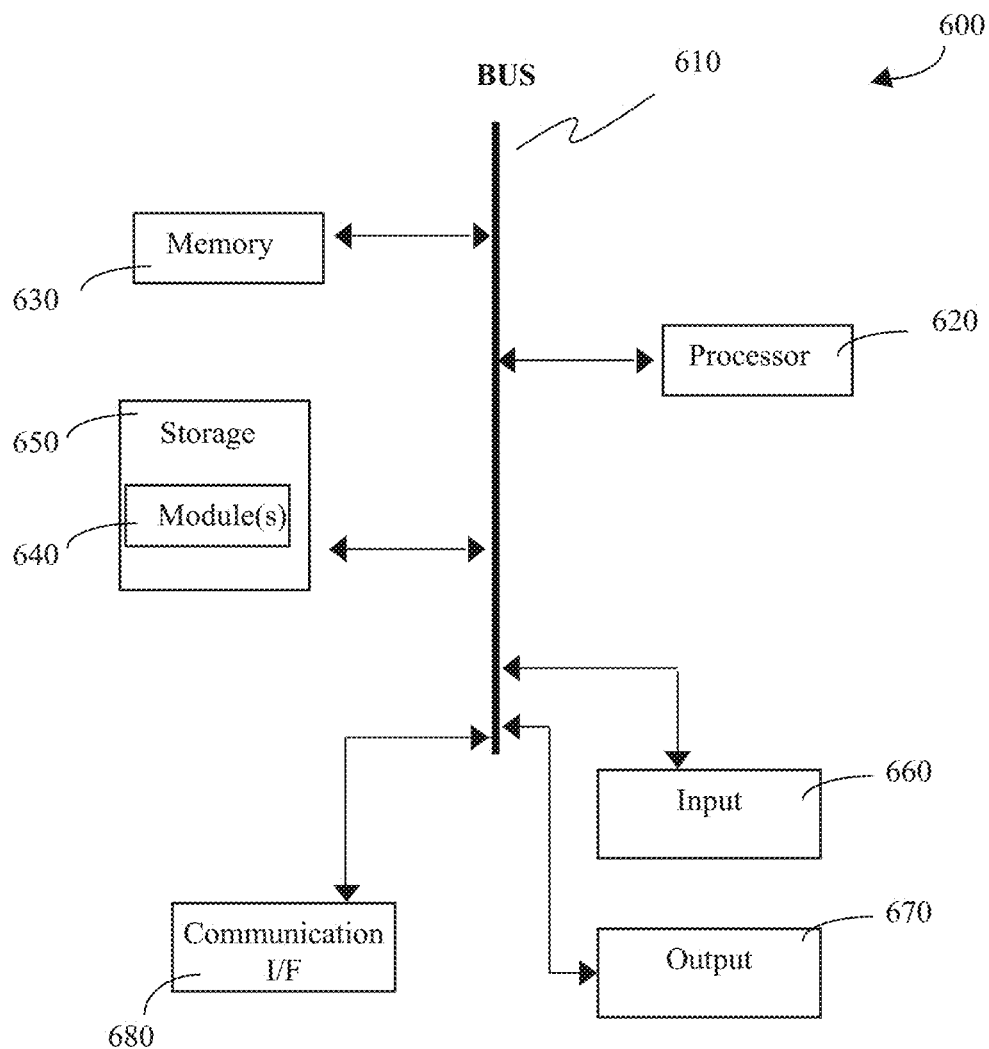
FIG. 6 is a block diagram illustrating an exemplary computing system in which various embodiments of the present disclosure may be implemented.

Turning to FIG. 6, illustrated is a logical arrangement of a set of general components of a basic general purpose system or computing device 600 (for example, a general purpose computer) which may be employed to practice the embodiments of the present disclosure. System bus 610 ties system components including system memory 630 (e.g., ROM and/or RAM) to processor 620. System bus 610 may generally be any suitable type of bus structure using any suitable bus architecture, such as for example, a memory bus or controller, a peripheral bus, or a local bus. Information transfer to/from the bus (and components) may be accomplished by any suitable means, such as for example a BIOS stored in ROM 630 or the like. System memory 630 may include other and different types of memory than ROM/RAM. Computing device 600 may have more than one processor 620 or may comprise a group or cluster of computing devices 600 networked together to provide greater processing capacity. Processor 620 may include any general purpose processor, with our without one or more hardware or software modules 640 stored in storage device 650, configured to control processor 620, as well as any special-purpose processor. Computing device 600 may include storage 650 (e.g., flash disk drive, hard disk drive, magnetic or optical disk drive, or the like). Storage device 650 may include one or more software modules 640 for controlling processor 620. In general, the drives and the associated non-transitory computer readable storage media provide nonvolatile storage of computer readable instructions, data structures, program modules and data for computing device 600. A person of ordinary skill in the art would know how to make variations to the basic components described to suit a particular function or need. Non-transitory computer-readable storage media expressly exclude media such as energy, carrier signals, electromagnetic waves, and signals per se.

With continuing reference to FIG. 6, computing device 600 may comprise input device 660 and output device 670. In general, input device 660 may be any number of input means, such as a microphone for speech, a touch-sensitive screen for gesture or graphical input, a keyboard, mouse, and the like. Also in general, output device 670 may any number of output means, such as for example a visual monitor (LCD, CRT, etc.), a printer, and the like. Communications interface 680 generally governs and manages the user input and system output. A person of ordinary skill in the art would know that the basic features described here may easily be substituted for improved hardware or firmware arrangements as they are developed.

The exemplary system of FIG. 6 is illustrated as including individual functional blocks. In general, the functions represented by these blocks may be provided through the use of either shared or dedicated hardware, including but not limited to, hardware capable of executing software and hardware that is purpose-built to operate as an equivalent to software executing on a general purpose processor. Some embodiments may include general processor, microprocessor and/or digital signal processor (DSP) hardware, read-only memory (ROM) (e.g., memory 630) for storing software performing the operations described herein, and random access memory (RAM) for storing results. Logical operations of various embodiments described herein may be implemented as, for example, a sequence of computer implemented steps, operations, or procedures running on a processor or processing resource within one or more general or specific-use computers. System 600 may practice all or part of the recited methods, may be a part of the recited systems, and/or may operate according to instructions in the recited non-transitory computer-readable storage media. Such logical operations may be implemented as modules configured to control processor 620 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media may be any available media that can be accessed by a general purpose or special purpose computer. Non-limiting examples may include: RAM, ROM, EEPROM, flash memory or other memory, CD-ROM, DVD or other optical disk storage, magnetic disk storage or other magnetic storage devices, or any other medium which can be used to carry or store desired information (e.g., program code means in the form of computer-executable instructions, data structures, or processor chip design). When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions may include, for example, instructions and data which cause a general purpose computer, special purpose computer, or special purpose processing device to perform a function or group of functions. Computer-executable instructions may also include program modules that are executed by computers in stand-alone or network environments. In general, program modules may include routines, programs, components, data structures, objects, and the functions inherent in the design of special-purpose processors, etc. that perform particular tasks or implement particular abstract data types. Computer-executable instructions, associated data structures, and program modules may represent examples of the program code means for executing steps of the methods disclosed herein. A particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure. We therefore claim as our invention all that comes within the scope of these claims.

We claim:

1. A computer-implemented method for updating and managing hosted catalogs in a procurement system, the method comprising, under the control of one or more sub-systems configured with executable instructions, the following steps:
   (a) providing a procurement system running on one or more processors comprising an input store, a data integration component, an application database, a base procurement application, and at least one live catalog and at least one staged catalog, wherein both the at least one live catalog and the at least one staged catalog are separately hosted catalogs and staged catalog information and live catalog information are stored independently in the application database, wherein the staged catalog is inaccessible to a buyer user of the procurement system and only accessible to an authorized user thereof, and wherein the data integration component is configured to be capable of inserting records directly to the at least one staged catalog and the at least one live catalog;
   (b) receiving a catalog update file to the input store, wherein the catalog update file comprises catalog update information having attribute information of at least one new item or updated attribute information of at least one existing item, or both, wherein each catalog update file comprises one of a commercial file and an enrichment file;
   (c) retrieving, by the data integration component, a set of core field values;
   (d) validating, by the data integration component, the catalog update information using the retrieved set of core field values and pre-determined value comparison rules to determine whether the catalog update information meets the pre-determined value comparison rules;
   (e) directly importing, by the data integration component, catalog update information of any enrichment file to the at least one live catalog, if the catalog update information is determined to meet the pre-determined value comparison rules, wherein the step of importing comprises reducing the catalog update file to a delta file consisting essentially of delta information, and creating insert records based on the delta file for insert into the application database;
   (f) importing, by the data integration component, catalog update information of any commercial file to the at least one staged catalog if the catalog update information is determined to meet the pre-determined value comparison rules, wherein the step of importing comprises reducing the catalog update file to a delta file consisting essentially of delta information, and creating insert records based on the delta file for insert into the application database;
   (g) presenting, by the base procurement application, the delta information from any commercial file to the authorized user of the procurement system and enabling the authorized user to accept or reject the delta information;
   (h) receiving an indication of acceptance by the authorized user; and
   (i) promoting, by the data integration component, the delta information from the at least one staged catalog to the at least one live catalog.

2. The computer-implemented method of claim 1, wherein the procurement system further comprises a central catalog service component and wherein performance of steps (d) through (i) is coordinated by the central catalog service component.

3. A computer-implemented method for updating and managing hosted catalogs in a procurement system, the method comprising, under the control of one or more sub-systems configured with executable instructions, the following steps:
   (a) providing a procurement system running on one or more processors comprising an input store, a data integration component, an application database, a base procurement application, and at least one live catalog and at least one staged catalog, wherein both the at least one live catalog and the at least one staged catalog are separately hosted catalogs and staged catalog information and live catalog information are stored independently in the application database, wherein the staged catalog is inaccessible to a buyer user of the procurement system and only accessible to an authorized user thereof, and wherein the data integration component is configured to be capable of inserting records directly to the at least one staged catalog and the at least one live catalog;
   (b) receiving a catalog update file to the input store, wherein the catalog update file comprises catalog update information having attribute information of at least one new item or updated attribute information of at least one existing item, or both, wherein each catalog update file comprises one of a commercial file and an enrichment file;

(c) retrieving, by the data integration component, a set of core field values;

(d) validating, by the data integration component, the catalog update information using the retrieved set of core field values and pre-determined value comparison rules to determine whether the catalog update information meets the pre-determined value comparison rules;

(e) directly importing, by the data integration component, catalog update information of any enrichment file to the at least one live catalog, if the catalog update information is determined to meet the pre-determined value comparison rules, wherein the step of importing comprises reducing the catalog update file to a delta file consisting essentially of delta information, and creating insert records based on the delta file for insert into the application database;

(f) importing, by the data integration component, catalog update information of any commercial file to the at least one staged catalog if the catalog update information is determined to meet the pre-determined value comparison rules, wherein the step of importing comprises reducing the catalog update file to a delta file consisting essentially of delta information, and creating insert records based on the delta file for insert into the application database;

(g) evaluating the delta information of any commercial file and determining whether the delta information needs to be approved or rejected by an authorized user of the procurement system;

(h) presenting, by the base procurement application, the delta information to an authorized user of the procurement system and enabling the authorized user to accept or reject the delta information, if the delta information is determined to need to be approved by an authorized user;

(i) receiving an indication of acceptance by the authorized user; and (j) promoting, by the data integration component, the delta information from the at least one staged catalog to the at least one live catalog.

4. The computer-implemented method of claim 3, wherein the procurement system further comprises a central catalog service and wherein performance of steps (d) through (j) is coordinated by the central catalog service component.

5. The computer-implemented method of claim 3, wherein the step of evaluating and determining is performed by a rules engine of the base procurement application.

6. The computer-implemented method of claim 5, wherein the rules engine is artificially intelligent.

7. A system comprising:

at least one device processor; and non-transitory computer-readable storage medium storing instructions that, when executed by the at least one processor, perform a method comprising:

(a) providing a procurement system running on the at least one device processor comprising an input store, a data integration component, an application database, a base procurement application, and at least one live catalog and at least one staged catalog, wherein both the at least one live catalog and the at least one staged catalog are separately hosted catalogs and staged catalog information and live catalog information are stored independently in the application database, wherein the staged catalog is inaccessible to a buyer user of the procurement system and only accessible to an authorized user thereof, and wherein the data integration component is configured to be capable of inserting records directly to the at least one staged catalog and the at least one live catalog;

(b) receiving a catalog update file to the input store, wherein the catalog update file comprises catalog update information having attribute information of at least one new item or updated attribute information of at least one existing item, or both, wherein each catalog update file comprises one of a commercial file and an enrichment file;

(c) retrieving, by the data integration component, a set of core field values;

(d) validating, by the data integration component, the catalog update information using the retrieved set of core field values and pre-determined value comparison rules to determine whether the catalog update information meets the pre-determined value comparison rules;

(e) directly importing, by the data integration component, catalog update information of any enrichment file to the at least one live catalog, if the catalog update information is determined to meet the pre-determined value comparison rules, wherein the step of importing comprises reducing the catalog update file to a delta file consisting essentially of delta information, and creating insert records based on the delta file for insert into the application database;

(f) importing, by the data integration component, catalog update information of any commercial file to the at least one staged catalog if the catalog update information is determined to meet the pre-determined value comparison rules, wherein the step of importing comprises reducing the catalog update file to a delta file consisting essentially of delta information, and creating insert records based on the delta file for insert into the application database;

(g) evaluating the delta information of any commercial file and determining whether the delta information needs to be approved or rejected by an authorized user of the procurement system;

(h) presenting, by the base procurement application, the delta information to an authorized user of the procurement system and enabling the authorized user to accept or reject the catalog update information, if the delta information is determined to need to be approved by an authorized user;

(i) receiving an indication of acceptance by the authorized user; and (j) promoting, by the data integration component, the delta information from the at least one staged catalog to the at least one live catalog.

8. The system of claim 7, wherein the procurement system further comprises a central catalog service component and wherein performance of steps (d) through (j) is coordinated by the central catalog service component.

9. The system of claim 7, wherein the step of evaluating and determining is performed by a rules engine of the base procurement application.

10. The system of claim 9, wherein the rules engine is artificially intelligent.

11. The computer-implemented method of claim 1, wherein the delta file is generated by the data integration component using a hashing procedure to compare data in the catalog update file with the data that then-exists in the hosted live catalog to determine which, if any, data is identical and therefore already present in the hosted live catalog.

12. The computer-implemented method of claim 3, wherein the delta file is generated by the data integration component using a hashing procedure to compare data in the catalog update file with the data that then-exists in the hosted live catalog to determine which, if any, data is identical and therefore already present in the hosted live catalog.

13. The system of claim 7, wherein the delta file is generated by the data integration component using a hashing procedure to compare data in the catalog update file with the data that then-exists in the hosted live catalog to determine which, if any, data is identical and therefore already present in the hosted live catalog.

* * * * *